United States Patent
Bettermann et al.

(10) Patent No.: US 8,710,692 B2
(45) Date of Patent: Apr. 29, 2014

(54) WIND FARM, WIND POWER PLANT IN A WIND FARM AND OPERATING CONTROL FOR THIS PURPOSE

(75) Inventors: Joachim Bettermann, Delmenhorst (DE); Boris Bloch, Martfeld (DE); Andreas Frye, Stuhr (DE); Michael Gottschalk, Ganderkesee (DE)

(73) Assignee: EADS Deutschland GmbH, Ottobrunn (DE)

( * ) Notice: Subject to any disclaimer, the term of this patent is extended or adjusted under 35 U.S.C. 154(b) by 248 days.

(21) Appl. No.: 13/289,757

(22) Filed: Nov. 4, 2011

(65) Prior Publication Data

US 2012/0119495 A1 May 17, 2012

(30) Foreign Application Priority Data

Nov. 5, 2010 (DE) .......................... 10 2010 050 591

(51) Int. Cl.
*F03D 9/00* (2006.01)
(52) U.S. Cl.
USPC .......................................................... 290/55
(58) Field of Classification Search
USPC .................................................... 290/54–55
See application file for complete search history.

(56) References Cited

U.S. PATENT DOCUMENTS

| | | | |
|---|---|---|---|
| 4,074,951 A * | 2/1978 | Hudson | 415/2.1 |
| 8,154,139 B2 * | 4/2012 | Egedal | 290/44 |
| 2008/0088129 A1 * | 4/2008 | Altemark et al. | 290/44 |
| 2008/0157538 A1 * | 7/2008 | Lewis | 290/4 R |
| 2008/0290664 A1 * | 11/2008 | Kruger | 290/55 |
| 2009/0102198 A1 * | 4/2009 | Egedal | 290/44 |
| 2009/0289804 A1 * | 11/2009 | Carstensen et al. | 340/601 |
| 2010/0187828 A1 * | 7/2010 | Reidy et al. | 290/55 |
| 2010/0276930 A1 * | 11/2010 | Fortmann | 290/44 |
| 2011/0006543 A1 * | 1/2011 | Hu | 290/55 |
| 2011/0229304 A1 * | 9/2011 | Fang | 415/60 |
| 2011/0293418 A1 * | 12/2011 | Baba | 416/1 |
| 2012/0169052 A1 * | 7/2012 | Leipold-Buettner et al. | 290/44 |
| 2013/0026759 A1 * | 1/2013 | Krueger et al. | 290/44 |

FOREIGN PATENT DOCUMENTS

| | | |
|---|---|---|
| DE | 10 2008 024 644 | 12/2009 |
| KR | 929111 | * 11/2009 |

* cited by examiner

*Primary Examiner* — Truc Nguyen
(74) *Attorney, Agent, or Firm* — Greenblum & Bernstein, P.L.C.

(57) ABSTRACT

Wind farm and method of controlling operation of a wind farm. The wind farm including a plurality of wind power plants, each equipped in a same manner with a pivoted rotor structure and a control device for controlling the operation of the individual wind power plants. The control device is structured and arranged to synchronize the rotary motions of the rotor structures of at least some of the plurality of wind power plants.

12 Claims, 3 Drawing Sheets

WIND FARM, WIND POWER PLANT IN A WIND FARM AND OPERATING CONTROL FOR THIS PURPOSE

CROSS-REFERENCE TO RELATED APPLICATIONS

The present application claims priority under 35 U.S.C. §119 of German Patent Application No. 10 2010 050 591.9, filed on Nov. 5, 2010, the disclosure of which is expressly incorporated by reference herein in its entirety.

BACKGROUND OF THE INVENTION

1. Field of the Invention

Embodiments of the present invention relates to energy generation from wind power using wind power plants assembled spatially to form a "wind farm." In particular, embodiments relates to a wind farm, a method for operating control of wind power plants, a wind power plant, and a method for operating control of a wind power plant.

2. Discussion of Background Information

Wind power plants of the type of interest here comprise a pivoted rotor structure, which is typically formed by a pivoted rotor shaft, a rotor hub at one end of the rotor shaft, and one or more rotor blades (rotor vanes) projecting from the rotor hub in the radial direction.

The rotor structure of the wind power plant is set in rotation by the wind force. Usually the rotor rotation (mechanical energy) is converted into electric energy by an electric generator and this electric energy is fed, e.g., into an electric grid.

Wind power plants of this type can cause disturbances in the operation of radar systems. Radar radiation reflected by the rotor structure or the rotor blades thereof undergoes a double displacement, depending on the direction of incidence of the radar radiation and rotational position or rotational speed of the rotor structure. In the case of radar systems with moving target recognition, which evaluate double displacements of this type, this can lead undesirably to corresponding parts of the rotor structure, that is, e.g., rotor blades, being misinterpreted as "flying objects." Because the rotor structure parts moving towards the radar system or away from the radar system cause double displacements in the reflected radar radiation, a target imaging may be produced on the radar screen that cannot be easily distinguished from a real flying target.

This problem is further intensified in that wind power plants are often installed in a spatial distribution of a plurality of such wind power plants (so-called "wind farm"). Over a wind farm formed by several wind power plants, the rotor structures of which over the entire wind farm area produce displays on the radar screen, real flying targets can be identified by the operator only with difficulty and in the worst case not at all, whereby, e.g., flight safety can be drastically reduced.

In the case of radar systems with constant false alarm rate (CFAR), a response sensitivity or a threshold value for the detection of a flying target is generally dependent on the reflected radar signals received. In practice, this means that high interference reflections from wind power plants increase the detection threshold value and thus could completely prevent the detection of a real flying target (with lower reflections).

The particularly interfering radar reflections on rotating rotor structural parts, such as rotor blades, take place primarily when these structural parts extend orthogonally to the direction of incidence of the radar radiation.

For example, for a wind power plant with a rotor structure pivoted about a horizontal axis and having rotor blades projecting radially therefrom, particularly interfering radar reflections result when a rotor blade is pointing vertically upwards or downwards.

In the case of such a very widespread "three-bladed" wind power plant type, that is, with three rotor blades distributed in the circumferential direction projecting from a rotor hub, the situation "rotor blade points upwards or downwards" thus applies six times during a complete 360° rotor rotation.

Through the rotation of the radar antenna of an air monitoring radar system, the wind power plants of a wind farm are not constantly illuminated, but periodically, only in a period that results from the rotational speed of the radar antenna, the spatial extension of the wind farm, the width of the antenna lobe and the distance of the wind farm from the radar system.

A high interference of the radar operation by the wind farm results when a rotor blade of at least one of the wind power plants is perpendicular during the chronological radar illumination intervals. Since this condition is met 6 times during a rotor rotation in the example under consideration here and a wind farm often has a larger number of wind power plants, when a wind farm is operated in the detection range of a radar system a high frequency of interference must be anticipated.

Two solution approaches are known from the prior art for the problem explained above:

In DE 10 2008 024 644 A1, for example, it is proposed to provide rotor blades at least in some regions in a radar-absorbing construction. However, the disadvantage with this approach is the associated reduction of the design freedom regarding the structure and material of the rotor blade.

Another approach to solving the problem lies when planning a wind farm in providing a spatial arrangement of the individual wind power plants that is advantageous relative to the location of a radar installation and with respect to the radar system parameters. Apart from a restriction of the design freedom for the wind farm (or for the radar system) associated therewith, the reduction of interference in the radar operation that can be achieved thereby is often unsatisfactory.

SUMMARY OF THE INVENTION

Embodiments of the present invention reduce interference with radar systems caused by the operation of wind power plants in wind farms.

In the case of a wind farm, which includes several wind power plants, each wind power plant is equipped in the same manner with a pivoted rotor structure and control device for controlling the operation of the individual wind power plants. Thus, embodiments include that the control device is embodied or formed to synchronize the rotary motions of the rotor structures of at least some of the wind power plants of the wind farm.

In particular, for example, the rotor structures of most or even all of the wind power plants of the wind farm can be synchronized.

The advantageous effect of the synchronization is explained based on the example of a typical wind farm already mentioned above, which is formed by a plurality of wind power plants with rotor structures rotating about a horizontal axis, which, e.g., have respectively three rotor blades arranged distributed in the circumferential direction.

In this case, the result of the synchronization is that the rotor blades of the relevant wind power plants (synchronized with one another) point vertically upwards or downwards more or less simultaneously. Thus, the time intervals in which the interference occurs are drastically reduced or minimized.

In accordance with embodiments, the probability of vertical rotor blades and thus the probability of interfering radar reflections during the radar illumination interval for example of a rotating radar antenna is reduced. Embodiments therefore have the advantage over the prior art that the frequency of interference is reduced.

Radar systems subdivide a radar detection range typically into several "radar resolution cells." Radar radiation retroreflected from the individual radar resolution cells is respectively processed or evaluated separately. This fact can be utilized within the scope of the embodiments in a surprisingly advantageous manner, e.g., in an embodiment in which a joint synchronization of the rotary motions of all of the rotor structures of the wind farm is not carried out, but several respective synchronizations of the rotary motions of those rotor structures are carried out which are located in one and the same radar resolution cell.

Due to the separate evaluation of the retroreflected radar beams that come from different radar resolution cells, the reduction of interference achieved according to the invention is also ensured in the entire radar detection range even with an embodiment of this type (with several synchronizations respectively assigned to a radar resolution cell).

Furthermore, here the reduction of a "synchronization effort" necessary for the synchronization and the reduction of an "efficiency loss" of the overall system (wind farm) caused by the synchronization is particularly advantageous. Due to the spatial limitation of each radar resolution cell, the natural fluctuations of the wind direction and wind force observed inside each radar resolution cell are lower than the corresponding fluctuations seen over the wind farm as a whole. In this respect each individual synchronization inside a radar resolution cell is much less problematic (e.g., with regard to the energy conversion efficiency) than a single synchronization over a wind farm that is more spatially extensive.

To further explain the reduction of interference, for example, the case of 5 wind power plants with three-bladed rotor structures within a radar resolution cell is considered. If the rotor structures are independent of one another at a given point in time with regard to the alignment of their rotor blades (uncorrelated), with assumed identical speed, after a complete 360° rotation of all rotor structures, the situation "at least one rotor blade within the radar resolution cell is pointing vertically" will occur a maximum of 30 times. With a sufficiently long illumination interval or with continuous illumination by the radar system, the wind power plants of the resolution cell would thus cause an interference 30 times in the course of one rotor revolution. However, if according to the embodiments the 5 wind power plants are synchronized with respect to their rotary motion or position of their rotor blades, the described interference situation occurs only 6 times during a rotor revolution. This corresponds to a reduction of the interference frequency in the resolution cell by a factor of 30/6=5. The interference frequency of the resolution cell therefore corresponds to only that of a single wind power plant. In the case of a rotating radar antenna, the probability of interference is reduced accordingly.

In one embodiment it is provided that the control device of the wind farm at the respective wind power plants comprise respective detection devices for detecting the rotary motion (e.g., angle of rotation) of the rotor structure.

In particular, a time-resolved (or defined at discrete points in time) rotary position such as, e.g., angle of rotation of the rotating rotor structure can be used to characterize the "rotary motion." Another possible representation of the rotary motion can be formed, e.g., from the rotation angular speed and rotation angle phase.

In one embodiment, the control device at the respective wind power plants comprises respective load variation devices for varying a load counteracting the rotary motion.

In one embodiment, the control device at the respective wind power plants comprises respective rotor axes and/or rotor blade adjustment devices for varying the wind power conversion efficiency.

In particular, such load variation devices or rotor axes and/or rotor blade adjustment devices can be advantageously used within the scope of the invention to achieve the synchronization (suitably controlled).

The term "synchronization" within the meaning of the embodiments has a very broad meaning, namely as any influence of the rotary motions of the respective rotor structures such that the rotary positions of the individual rotor structures that interfere particularly with a radar system do not occur independently of one another and randomly in the course of time, but occur more or less "bundled in terms of time" (ideally simultaneously). In order to achieve a synchronization of this type, the respective rotary motions must be adapted to one another with respect to the speeds as well as with respect to the "rotation phases." Naturally, although in principle the reduction in interference is better, the more exactly the synchronization is produced, inversely a not quite exact synchronization, depending on its degree, already produces an advantageous reduction in interference.

Embodiments can be used advantageously for wind farms on land as well as for wind farms on water ("offshore wind farms"). In one embodiment, the wind farm comprises at least 10 wind power plants, in particular, e.g., at least 20 or, e.g., at least 50 wind power plants.

Embodiments are suitable in particular for wind power plants in which the rotor structures are respectively formed by a rotor with rotor blades projecting therefrom in a radially elongated manner, such as, e.g., a three-bladed rotor with rotor blades arranged uniformly (at 120° intervals) in the circumferential direction.

Of course, embodiments in principle can also be used for wind power plants with different types of rotor structures, as long as these rotor structures have a certain "similarity," which renders possible a "synchronization" of their rotary motions.

Although a horizontal orientation of the rotation axis of the rotor structure is very widespread among wind power plants, the orientation of this rotation axis within the scope of the invention is of lesser importance. For example, the invention could also be used for wind power plants with vertically oriented rotor rotation axis.

In one embodiment, the control device comprises a central control unit to set a certain desired rotary motion for the respective rotor structures (to be synchronized with one another). The control unit can hereby be provided inside the wind farm, for example, integrated in one of the wind power plants, or arranged outside the wind farm and connected to the wind farm via a wired or wireless communication connection (also, e.g., containing an Internet connection).

In a more specific embodiment, the desired rotary motion is provided as a rotary motion, detected by a sensor, of one specific rotor structure. In this case, the synchronization of several wind power plants takes place with respect to the position of their rotor structures, e.g., in that the speed and rotor position are registered on one single wind power plant ("master wind power plant") and, e.g., corresponding information thereon is transmitted to the other wind power plants to be synchronized. This transmission can be carried out in a wired manner and/or wirelessly (by radio), directly and/or indirectly, e.g., using a central control unit, which can be structurally combined with or identical to the control unit already mentioned for setting the desired rotary motion. On the basis of the transmitted information, the other wind power plants can then synchronize by their own control devices the rotary motions of their rotor structures with the set desired rotary motion.

In one embodiment variant, it is provided that all of the wind power plants to be synchronized respectively transmit information on their own rotary motion (detected by sensors) to a central control unit, whereupon this central control unit according to a synchronization algorithm feeds back corresponding correction commands to the individual wind power plants, on the basis of which the wind power plants adjust their rotary motions correspondingly by their own control devices.

The details explained above regarding the use of a rotary motion detected by sensors of one specific rotor structure as the "desired rotary movement" can also be provided analogously for embodiments in which the desired rotary motion is established by other devices. In an embodiment that is advantageous in this respect, e.g., it is provided that the desired rotary motion is established by a control unit according to an operating control algorithm on the basis of information on the instantaneous rotary motions (detected by sensors) of all of the wind power plants to be synchronized. For example, the desired rotary motion can hereby be established (calculated) as a result of an "averaging" regarding these instantaneous individual rotary motions. The desired rotary motion set in this manner and/or calculated correction commands based thereon can then be continuously transmitted to the respective wind power plants.

In principle, the synchronization according to the embodiments can require a deceleration and/or acceleration of the rotor movement of the individual wind power plants. In view of the technical equipment usually available anyway in modern wind power plants, both are more or less unproblematic. A deceleration as well as an acceleration of the rotary motion can be caused in two ways, i.e., by a variation of the load that counteracts the rotary motion, that is, e.g., by a load caused by an electric generator, and by a variation of the wind power conversion efficiency of the respective rotor structure, that is, e.g., variation of the aerodynamic conditions, such as, e.g., rotating the rotor blades about their longitudinal axis ("pitches") and/or twisting a horizontal rotor rotation axis about a vertical axis.

In order to decelerate a rotary motion, at the respective wind power plant, e.g., the electric generator load can be increased and/or, e.g., the angle of attack of the rotor blades can be "degraded." Conversely, if an acceleration of the rotary motion is necessary, the electric generator load can be reduced and/or "improved aerodynamics" can be adjusted. In this context, it has proven to be a great advantage that modern wind power plants are not operated at "maximum rotor speed" for the purpose of optimizing their efficiency. There is therefore advantageously a certain margin with regard to the speed of the rotor structure, which can be used advantageously for the synchronization according to the embodiments.

In a further development of the embodiments, the wind farm comprises a communication device for communicating a desired rotary motion and/or one or more rotary motions, detected by sensors, of the rotor structures to an external technical device, in particular a radar system. This communication device can be connected, e.g., to the mentioned control unit, which has information on the desired rotary motion or which sets this desired rotary motion. In this embodiment, in particular two advantages can be achieved: on the one hand, in the correct operation of the wind farm, precise information on when the interfering radar reflections mentioned at the outset occur, can thus be transmitted, e.g., to a radar system, so that on the basis of this information a corresponding adjustment (e.g., synchronization) of the radar illumination intervals can take place, so that the times of the interferences lie outside these illumination intervals. On the other hand, an operation of the wind farm that may not be according to specifications can therewith be communicated to the external technical device, e.g., a radar system, in the detection range of which the wind farm is located.

A method according to the invention for controlling the operation of several wind power plants respectively equipped in the same manner with a pivoted rotor structure in a wind farm is characterized in that the rotary motions of the rotor structures of at least some of the wind power plants are synchronized.

The special embodiments and design options for the wind farm already described can also be provided in an analogous manner for this operating control method according to the invention.

According to a further aspect of the embodiments, a wind energy plant is provided in a wind farm, comprising A detection device for detecting the rotary motion of a pivoted rotor structure of the wind power plant, A controllable load variation device for varying a load counteracting the rotary motion of the rotor structure and/or a controllable efficiency adjustment device for varying the wind power conversion efficiency of the rotor structure, and A control device for controlling the load variation device or the efficiency adjustment device, wherein the control device is embodied to control the load variation device and/or the efficiency adjustment device for a synchronization of the rotary motion of the rotor structure with a desired rotary motion, which is communicated to the control device of the wind power plant by an external device.

According to a further aspect of the embodiments, a method for controlling the operation of a wind power plant in a wind farm is provided, comprising:

Detection of the rotary motion of a pivoted rotor structure of the wind power plant, and Variation of a load counteracting the rotary motion of the rotor structure and/or variation of the wind power conversion efficiency of the rotor structure, wherein the load variation and/or the efficiency adjustment is carried out for a synchronization of the rotary motion of the rotor structure with a desired rotary motion, which is communicated to the wind power plant by an external device.

Corresponding further developments also result for the wind power plant according to the invention and the operating control method of a wind power plant according to the invention, in particular from the above explanation of the wind farm according to the invention.

Embodiments of the invention are directed to a wind farm that includes a plurality of wind power plants, each equipped in a same manner with a pivoted rotor structure and a control device for controlling the operation of the individual wind power plants. The control device is structured and arranged to synchronize the rotary motions of the rotor structures of at least some of the plurality of wind power plants.

According to embodiments, the control device can include a central control unit to set a certain desired rotary motion for respective rotor structures.

In accordance with other embodiments, the wind farm can further include a sensor on a specific rotor structure. The desired rotary motion may be a rotary motion detected by the sensor of the specific rotor structure.

According to still other embodiments, the wind farm may include sensors on each rotor structure and a communication device for communicating at least one of a desired rotary motion and at least one rotary motion detected by the sensors of the rotor structures to an external technical device. The external technical device may be a radar system.

Embodiments of the invention are directed to a method for controlling the operation of several wind power plants that are respectively equipped in the same manner with a pivoted rotor structure in a wind farm. The method includes synchronizing rotary motions of the rotor structures of at least some of the wind power plants.

Embodiments of the invention are directed to a wind power plant in a wind farm that includes a detection device for detecting rotary motion of a pivoted rotor structure of the wind power plant, at least one of a controllable load variation device for varying a load counteracting the rotary motion of the rotor structure and a controllable efficiency adjustment device for varying the wind power conversion efficiency of the rotor structure, and a control device for controlling the at least one of the load variation device or the efficiency adjustment device. The control device is structured and arranged to control the at least one of the load variation device and the efficiency adjustment device for a synchronization of the rotary motion of the rotor structure with a desired rotary motion, which is communicated to the control device of the wind power plant by an external device.

Embodiments of the invention are directed to a method for controlling the operation of a wind power plant in a wind farm. The method includes detecting a rotary motion of a pivoted rotor structure of the wind power plant, and at least one of varying a load counteracting the rotary motion of the rotor structure and varying the wind power conversion efficiency of the rotor structure. The at least one of the load variation and the efficiency adjustment is carried out for synchronizing of the rotary motion of the rotor structure with a desired rotary motion, which is communicated to the wind power plant by an external device.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
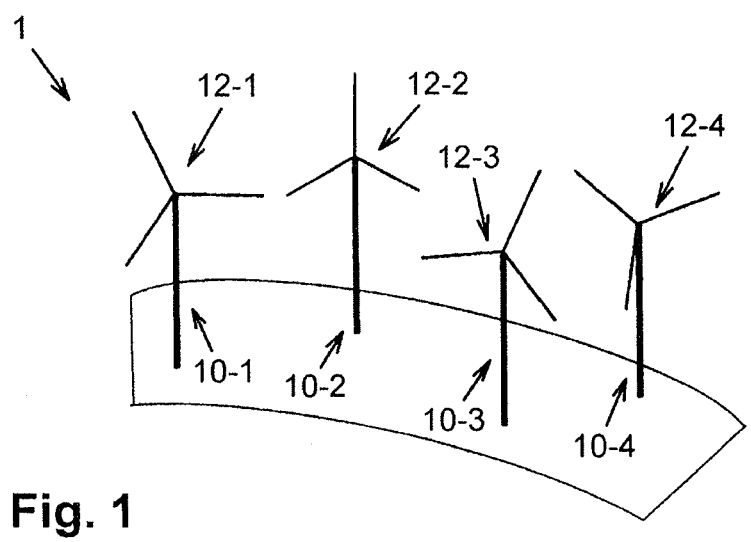
FIG. 1 illustrates a wind farm with several wind power plants in an unsynchronized condition.

FIG. 1 shows a wind farm 1 comprising four wind power plants 10-1 through 10-4 and control device (not shown) for controlling the operation of the individual wind power plants 10-1 through 10-4.

The reference numbers of components provided several times in one embodiment, but analogous in their action, such as, e.g., the wind power plants 10-1 through 10-4, are numbered consecutively (in each case with the addition of a hyphen and a consecutive number). Reference is also made below to individual such components or to the totality of such components by the reference number without addition.

The wind power plants 10 are respectively equipped in the same manner with a pivoted rotor structure 12, by way of which the wind power is converted into a rotary motion of the rotor structure 12 and in this manner is used for the yaw drive of an electric generator.

In the exemplary embodiment shown, the "same manner" of the equipment of the wind power plants 10 with the rotor structures 12 lies in that each rotor structure 12 is formed by a rotor pivoted about a horizontal axis with three radially projecting rotor blades uniformly distributed in the circumferential direction.

In the exemplary embodiment shown, the wind power plants 10 are of the very widespread plant type comprising a tower projecting vertically with a machine housing rotatable about a vertical axis at the upper tower end, in which housing a rotor shaft of the rotor structure 12 is pivoted and connected to the electric generator directly or indirectly (e.g., via a transmission). A rotor hub is located on one end of the rotor shaft projecting out of the machine housing, from which rotor hub the rotor blades mentioned and shown in the drawing of FIG. 1 project. Moreover, in each machine housing there is a control unit, by which on the basis of operating parameters (e.g., wind direction, wind speed, etc.) detected by sensors and/or input control signals, controllable components of the wind power plant are controlled. These controllable components typically include drive devices by which the rotor blades can be rotated about their longitudinal axis in order to change their angle of attack, as well as to rotate the machine housing and thus rotor rotation axis about the vertical axis in order to adjust the azimuth angle of the rotor structure 12 with respect to the wind direction. Furthermore, controllable components can be provided in the region of the electric generator (e.g., for adjusting the electric power dissipated) and in the region of the transmission optionally present.

Each wind power plant 10 furthermore comprises a detection device for detecting parameters of the rotary motion of the associated rotor structure 12. In the example shown, a speed (e.g., rotation angular speed or rpm) as well as a "rotation phase" is detected (measured or determined from measured variables). The important factor is that the detection of the rotary motion of the rotor structure 12 provides time-resolved information on the "rotational position" of the rotor 12.

In general, the "rotational position" with each rotor structure 12 can be given, e.g., by a rotation angle lying in the 360° interval (one rotor revolution). Since the rotor structure 12 usually has a certain symmetry, and does so in the exemplary embodiment shown, the rotational position within the meaning of the invention can often be given "in a simplified manner" by a rotation angle within a rotation angle interval, which is smaller than the 360° interval corresponding to a full rotor revolution.

The three-fold rotational symmetry of the rotor structure 12 in the exemplary embodiment shown makes it possible for the purposes of the invention to express the rotational position of the rotor structure 12 as a rotation angle within a 120° interval. A rotation of the rotor structure 12 by 120° does not lead to any change in the "rotational position" within this meaning.

Although in the prior art the individual control units of the wind power plants of a wind farm are often in communicating connection with a central control unit, which can be located inside or outside the wind farm, the individual control units of the wind power plants operate independently of one another in that with each wind power plant the controllable components are operated for the most efficient possible conversion of the wind power into electric power.

In the wind farm 1 shown, however, it is a special feature that (at least in one operating mode) the rotary motions of the rotor structures 12 of at least some, for example, all of the wind power plants 10 are synchronized. In other words, the respective rotor structures 12 in this operating mode at every point in time have more or less identical rotational positions.

In a non-synchronized condition of the rotary motions, in practice a more or less random distribution of the rotation angle positions of the individual rotor structures 12 will result. In contrast, the frequency density of these rotation angle positions observed over the respective rotation angle range in the synchronized condition will deviate appreciably from an essentially constant frequency density. In the synchronized condition, the frequency density of the rotation angle positions of the respective rotor structures 12 will have at least one more or less pronounced maximum.

In order to achieve this, the control device of the wind farm 1 can comprise, for example, a central control unit for setting a specific desired rotary motion for the rotor structures 12 to be synchronized.

A synchronization of this type can be produced by a suitable communication between the respective wind power plants 10 and/or the mentioned central control unit.

Figure 2:
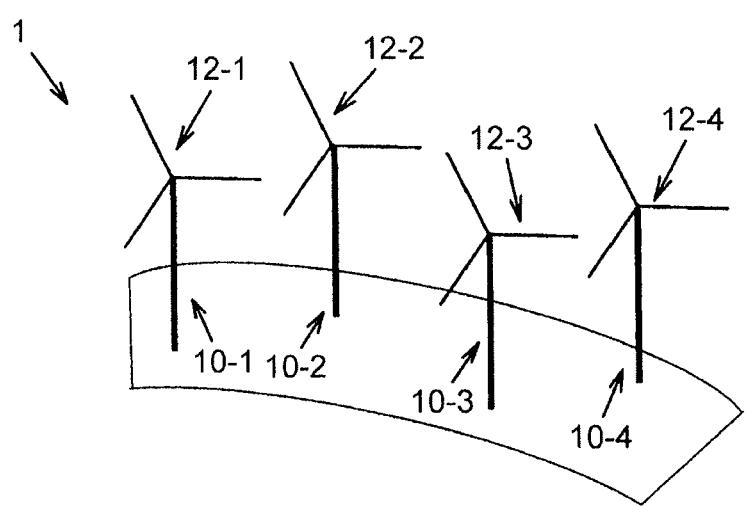
FIG. 2 illustrates the wind farm depicted in FIG. 1 in a synchronized condition.

FIG. 2 shows the wind farm 1 in a synchronized condition, in which the individual rotor structures 12-1 through 12-4 at every point in time have an identical rotational position defined by the desired rotary motion. In contrast, the rotational positions of the rotor structures 12-1 through 12-4 in the condition shown in FIG. 1 are distributed in an uncorrelated or random manner.

Through the synchronization of the rotary motions, interference is advantageously reduced during the operation of a radar system (not shown), in the detection range of which the wind farm 1 is located.

It is assumed that the radar radiation emitted by the radar system strikes essentially in the horizontal direction the rotating rotor structures 12 of the wind farm 1. In this case, in particular rotor blades pointing vertically upwards or vertically downwards can cause a greater double displacement of the radar radiation reflected back to a radar antenna, which undesirably can lead to a misinterpretation of these rotor blades as "flying objects."

Interference of this type is more serious in the exemplary embodiment shown, the more frequently the situation "at least one rotor blade is pointing vertically" occurs in the wind farm 1. In the uncorrelated condition according to FIG. 1, this interfering condition (assuming essentially identical speed of the rotor structures 12-1 through 12-4) occurs in all approximately 4×3×2=24 times per rotor revolution (4 rotor structures, 3 rotor blades per rotor structure, 2 vertical positions, namely upwards and downwards, per rotor blade).

In the synchronized condition according to FIG. 2, this interference situation advantageously does not occur so often, namely per rotor revolution only 3×2=6 times (3 always identically positioned rotor blade pluralities, 2 vertical positions, namely upwards and downwards, per rotor blade plurality). This means a reduction of the interference frequency by a factor of 24/6=4. In the exemplary embodiment shown, this factor corresponds to the number of wind power plants 10 in the wind farm 1. Accordingly, this interference reduction factor is correspondingly higher in the case of larger wind farms, for example with at least 20 or at least 50 wind power plants.

In particular, for a wind farm that is composed of a larger number of wind power plants, this interference reduction can already be achieved in that not all of the wind power plants of the wind farm are synchronized with one another to a common desired rotary motion, but wind power plants respectively associated with a certain "radar detection cell" of the radar detection range are synchronized with one another. The desired rotary motions respectively assigned to a radar detection cell can be easily distinguished from one another hereby, both in terms of speed as well as in terms of rotational phase.

In the following description of further exemplary embodiments, the same reference numbers are used for components with the same action, respectively with the addition of a lower-case letter to distinguish the embodiment. Only the differences from the already described exemplary embodiments are essentially dealt with here, and otherwise we refer explicitly to the description of previous exemplary embodiments.

Figure 3:
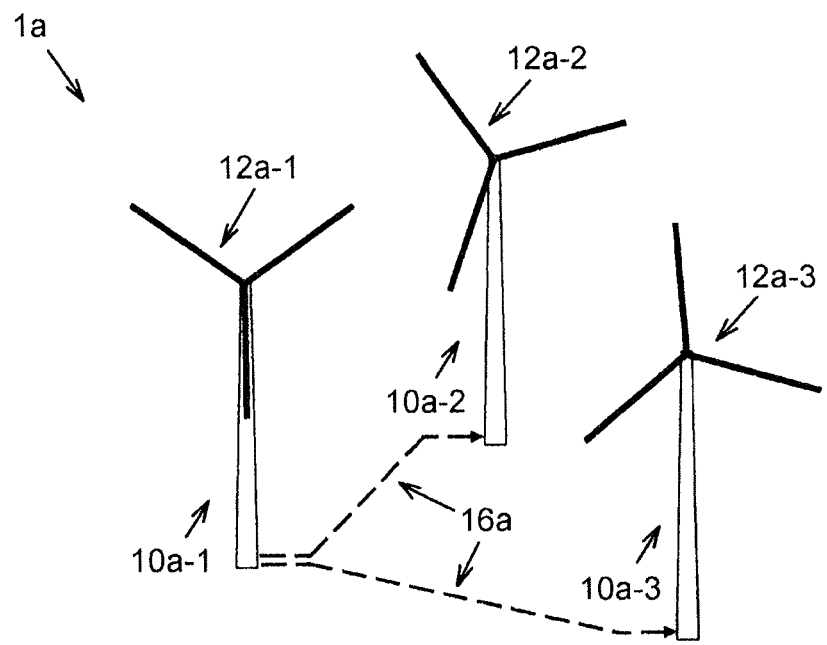
FIG. 3 illustrates a wired transmission of information in a wind farm.

FIG. 3 shows a wind farm 1*a* comprising three wind power plants 10*a*-1 through 10*a*-3 with respective rotor structures 12*a*-1 through 12*a*-3.

It is assumed in this exemplary embodiment that the wind power plant 10*a*-1 as a "master wind power plant" is used for establishing the desired rotary motion of all of the wind power plants 10*a*. The rotary motion of rotor structure 12*a*-1 detected by sensors on the wind power plant 10*a*-1 is communicated to the other wind power plants 10*a*-2 and 10*a*-3 via communication cables 16*a*, so that their respective control units can suitably control the controllable components for the desired synchronization of the rotary motions of the rotor structures 12*a*-2 and 12*a*-3 respectively to the rotary motion of rotary structure 12*a*-1.

Figure 4:
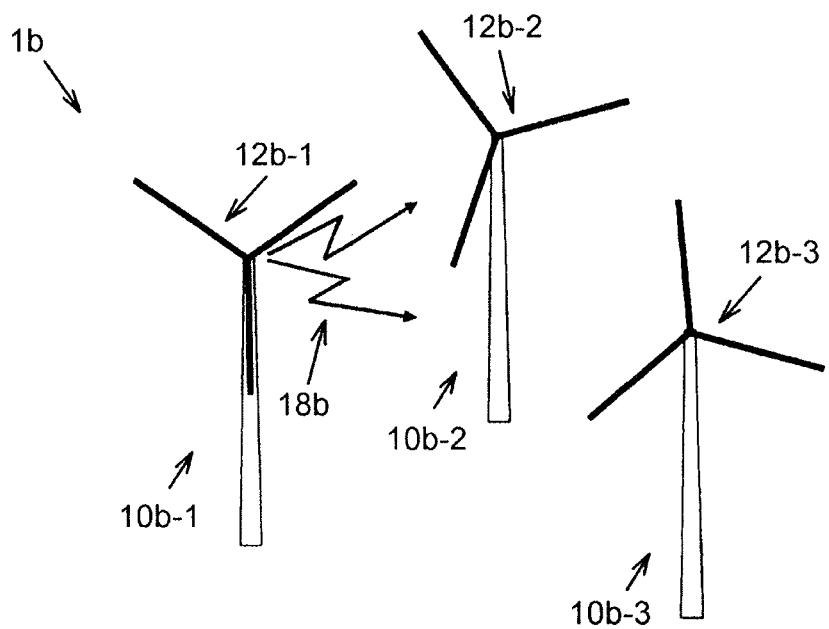
FIG. 4 illustrates a wireless transmission of information in a wind farm.

FIG. 4 shows a wind farm 1*b*, which differs from wind farm 1*a* only in that instead of the communication cable 16*a* a wireless communication connection 18*b* is provided in order to transmit the set desired rotary motion of a "master wind power plant" 10*b*-1 to the other wind power plants 10*b*-2 and 10*b*-3 to be synchronized.

Figure 5:
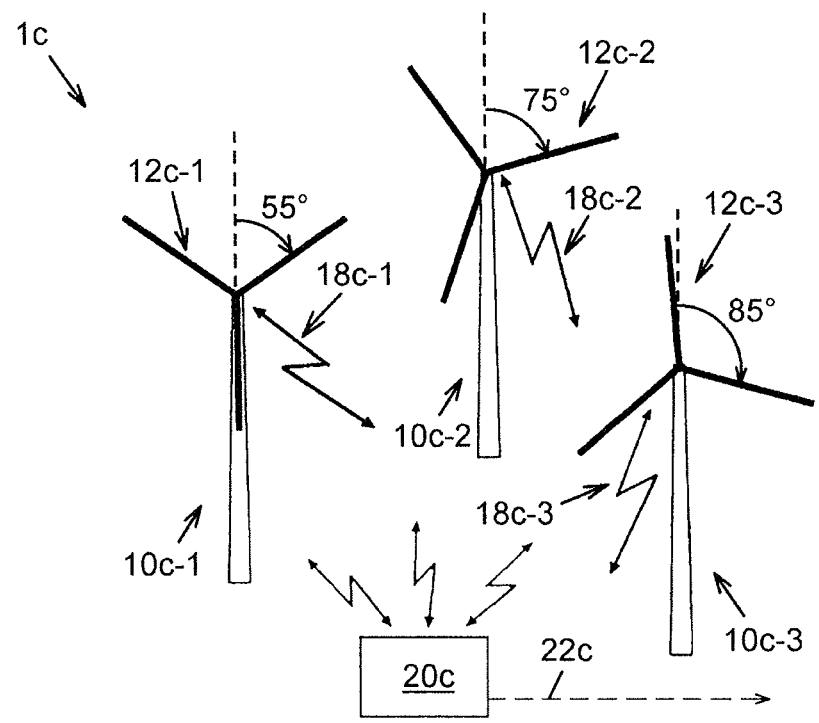
FIG. 5 illustrates a wireless transmission of information in a wind farm according to a modified exemplary embodiment.

FIG. 5 shows a wind farm 1*c*, in which, in contrast to the wind farm 1*b* according to FIG. 4, a desired rotary motion is not set by one of the wind power plants 10*c*, but by a central control unit 20*c*, which communicates with the individual wind power plants 10*c*-1 through 10*c*-3 via bidirectional wireless communication connections 18c-1 through 18c-3. For this purpose the central control unit 20c and the local control units provided on the individual wind power plants 10c-1 through 10c-3 are equipped with respective communication devices (transmitter/receiver devices).

The central control unit 20c comprises a program-controlled computer device with which the setting of the desired rotary motion is carried out as follows: the respective wind power plants (to be synchronized to a desired rotary motion), that is, e.g., all wind power plants 10c-1 through 10c-3, communicate their instantaneous rotary positions or rotary motions detected by sensors via the wireless communication connections 18c continuously to the central control unit 20c.

At least respectively one variable representative of the instantaneous rotary position of the respective rotor structure 12c is communicated. For example, the rotation angle between a radial direction running from the rotor hub vertically upwards and the radial extension direction of that rotor blade which last passed this vertical direction in the rotor rotation, which is entered for each of the rotor structures 12c, is suitable as a variable of this type. In the "snapshot" shown in FIG. 5 the rotation angles of the rotor structures 12c-1, 12c-2 and 12c-3 are 55°, 75°, and 85° respectively. The control unit 20c continuously (e.g., at short intervals of time) forms the arithmetic average of these angles, which in the case shown provides an average rotation angle of (55°+75°+85°)/3=71.7°. This average angle is set as desired rotation angle at this moment. Then corresponding corrections are made at the individual wind power plants 10c to the rotary motions of the rotor structures 12c in the sense of a matching of the actual rotation angles to one another. In the example shown this means that the rotor structure 12c-1 should tend to be accelerated (since its rotation angle of 55° is smaller than the desired rotation angle of 71.7°), while the rotor structures 12c-2 and 12c-3 should tend to be decelerated (since their rotation angles are greater than the desired rotation angle). By repeating these steps of measuring an actual rotational condition, setting a desired rotational condition and individual corresponding rotary motion corrections, a regulated synchronization can thus be carried out, in which the rotary motions of all of the rotor structures 12c-1 through 12c-3 are matched to one another with more or less minor deviations.

It is possible in the calculation of a desired rotation angle as well as in the calculation of a quantitative dimension of an acceleration or deceleration expedient for the rotary motion correction, that instantaneous speeds (e.g., rotation angular speeds) of the respective rotor structures 12c are also taken into consideration hereby.

Naturally, one with average skill in the art with respect to the intended purpose of rotor synchronization, in particular also taking into consideration the instantaneous speeds and/or other parameters such as, e.g., current adjustment parameters at the individual wind power plants 10c (e.g., rotor blade adjustment angle, etc.) or other local parameters (such as, e.g., wind force, etc.), can also devise other algorithms for setting a desired rotation angle or a desired speed, in particular in order to also achieve therewith, in addition to the synchronization, the largest possible overall efficiency of the wind farm 1c. Since it is important with the synchronization in the example shown essentially only that the interference situations "rotor blade is pointing vertically upwards or downwards" occur as "close together in time" as possible or simultaneously, a complicated synchronization algorithm could also provide, for example, that not all of the rotor structures 12c are operated at the same speed, but, e.g., part of the rotor structures 12c rotate at half the speed of the other rotor structures. The advantageous effect of a bundling in terms of time of the interference situations "rotor blade pointing vertically" can be achieved even with a synchronization of this type. Here is an example: when the rotor structures 12c-1 and 12c-2 rotate at an identical speed, so that the interference condition occurs after respectively 1 s, the rotor structure 12c-3 could also be operated at half the speed and matching rotation phase such that the interference condition occurs only every 2 s at the rotor structure 12c-3 (and namely as far as possible simultaneously with the occurrence of the interference condition at rotor structures 12c-1 and 12c-2). As the rotor structures 12c that rotate at half the speed, for example those could be selected in which the local wind force, averaged in terms of time, tends to be lower than with the other rotor structures.

The calculation of the quantitative rotary motion corrections can be carried out by the central control unit 20c as well as by the respective local control units of the wind power plants 10c. A simple algorithm for calculating a correction measurement of this type lies in setting this measurement depending on the instantaneous angular difference between the actual rotation angle and the desired rotation angle. Alternatively or additionally, speed differences between the actual speed and desired speed can also be used for this purpose.

In FIG. 5 furthermore a communication connection 22c is symbolized, via which the information on the desired rotary motion and/or information on one or more of the rotary motions, detected by sensors, of the rotor structures 12c of the wind farm 1c are communicated to a radar system, in the detection range of which the wind farm 1c is located. This has the advantage that information valuable for the radar operation is provided on the part of the external technical device (in this case therefore, e.g., the radar system). This information with correct operation of the wind farm 1c can also be profitably used by the radar system (in addition to the radar radiation reflected back).

Figure 6:
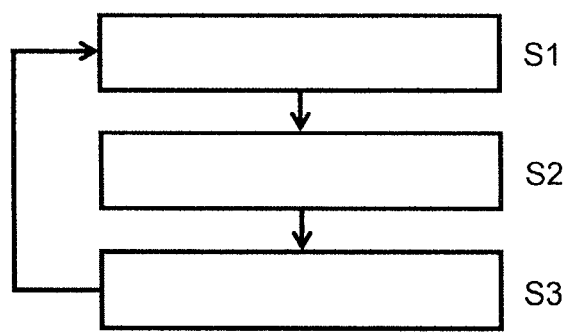
FIG 6 illustrates a flow chart of a controlled adjustment of the rotary motion of a wind power plant rotor structure.

FIG. 6 illustrates once again the sequence of a method for the regulated adjustment of a rotary motion to a set desired rotary motion. The method can be carried out, e.g., in respective control units of the wind power plants to be synchronized to this desired rotary motion (alternatively, e.g., in a central control unit, which is in communicational connection with these wind power plants).

In a first step S1 a detection takes place (e.g., direct measurement or calculation from suitable measured variables) of the actual rotary motion of the respective rotor structure.

In a second step S2 a comparison takes place between the actual rotary motion and the set desired rotary motion and, based thereon, the establishment of a rotary motion correction setting depending on a deviation between the actual and desired rotary motion.

In a third step S3, finally a deceleration or acceleration as needed of the respective rotor structure takes place depending on the correction setting established in step S2.

Then the processing advances again to the first step S1.

In the simplest case, a rotation angle can be used as the "rotary motion" and the corresponding rotation angle difference can be used as the "correction setting." As already mentioned, the rotary motion can optionally be characterized also by further parameters, in particular a speed, wherein accordingly, e.g., a speed difference (between the actual speed and a desired speed) can be incorporated in the establishment of the correction setting.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A wind farm comprising:
a plurality of wind power plants, each equipped in a same manner with a pivoted rotor structure; and
a control device for controlling the operation of the individual wind power plants,
wherein the control device is structured and arranged to synchronize the rotary motions of the rotor structures of at least some of the plurality of wind power plants by one of:
detecting the rotary motion of the rotor structure of one of the plurality of wind power plants via sensors on the wind power plant and communicating the detected rotary motion to control devices of other rotary structures of the plurality of wind structures to adjust the rotary motions of the other rotary structures with the detected rotary motion; or
communicating with local controls of the plurality of wind power plants to receive one of an instantaneous rotary positions of the rotary structures of the plurality of wind power plants or rotary motions of the rotary structures of the plurality of wind power plants detected by sensors on the plurality of wind power plants; continuously forming an arithmetic average of rotation angles of the plurality of wind power plants; and communicating the arithmetic average of rotation angles to the local controls to adjust the respective rotary structures to the arithmetic average of rotation angles.

2. The wind farm according to claim 1, wherein the control device comprises a central control unit associated with the one of the plurality of wind power plants to set a certain desired rotary motion for the other rotary structures of the plurality of wind power plants.

3. The wind farm according to claim 2, wherein the desired rotary motion is the detected rotary motion of the rotor structure of the one of the plurality of wind power plants.

4. The wind farm according to claim 1, wherein the sensors are arranged on the rotor structure of the one of the plurality of wind power plants and the one of the control device includes a communication device for communicating a desired rotary motion of the rotor structures of the one of the plurality of wind power plants to an external technical device.

5. The wind farm according to claim 4, wherein the external technical device is a radar system.

6. A method for controlling the operation of several wind power plants that are respectively equipped in the same manner with a pivoted rotor structure in a wind farm, the method comprising:
synchronizing rotary motions of the rotor structures of at least some of the wind power plants by one of:
detecting the rotary motion of the rotor structure of one of the plurality of wind power plants via sensors on the wind power plant and communicating the detected rotary motion to control devices of other rotary structures of the plurality of wind structures to adjust the rotary motions of the other rotary structures with the detected rotary motion; or
communicating with local controls of the plurality of wind power plants to receive one of an instantaneous rotary positions of the rotary structures of the plurality of wind power plants or rotary motions of the rotary structures of the plurality of wind power plants detected by sensors on the plurality of wind power plants; continuously forming an arithmetic average of rotation angles of the plurality of wind power plants; and communicating the arithmetic average of rotation angles to the local controls to adjust the respective rotary structures to the arithmetic average of rotation angles.

7. A wind power plant in a wind farm, comprising:
a detection device for detecting rotary motion of a pivoted rotor structure of the wind power plant;
at least one of a controllable load variation device for varying a load counteracting the rotary motion of the rotor structure and a controllable efficiency adjustment device for varying the wind power conversion efficiency of the rotor structure; and
a control device for controlling the at least one of the load variation device or the efficiency adjustment device,
wherein the control device is structured and arranged to control the at least one of the load variation device and the efficiency adjustment device for a synchronization of the rotary motion of the rotor structure with an arithmetic average of the rotation angles of a plurality of wind power plants, which is communicated to the control device of the wind power plant by an external device, and wherein the plurality of wind power plants includes the wind power plant.

8. A method for controlling the operation of a wind power plant in a wind farm comprising
detecting a rotary motion of a pivoted rotor structure of the wind power plant; and
at least one of varying a load counteracting the rotary motion of the rotor structure and varying the wind power conversion efficiency of the rotor structure,
wherein the at least one of the load variation and the efficiency adjustment is carried out for synchronizing of the rotary motion of the rotor structure with an arithmetic average of the rotation angles of a plurality of wind power plants, which is communicated to the control device of the wind power plant by an external device, and wherein the plurality of wind power plants includes the wind power plant.

9. The wind farm according to claim 1, wherein the control device comprises a central control unit to establish and set a certain desired rotary motion for the rotary structures of the plurality of wind power plants.

10. The wind farm according to claim 9, wherein the desired rotary motion is set by the forming of the arithmetic average of rotation angles.

11. The wind farm according to claim 1, wherein the sensors are arranged on each rotor structure of the plurality of wind power plants and the control device includes a communication device for communicating the one of an instantaneous rotary positions of the rotary structures of the plurality of wind power plants or rotary motions of the rotary structures of the plurality of wind power plants detected by sensors on the plurality of wind power plants to an external technical device.

12. The wind farm according to claim 11, wherein the external technical device is a radar system.

\* \* \* \* \*